US008965831B2

(12) United States Patent
Kaledhonkar et al.

(10) Patent No.: US 8,965,831 B2
(45) Date of Patent: Feb. 24, 2015

(54) SYSTEM, METHOD, AND SOFTWARE PROGRAM PRODUCT FOR ENABLING USERS TO CREATE AND USE RULE PATTERNS TO GENERATE CUSTOM PRODUCT-CONFIGURATION RULES

(75) Inventors: Vikram V. Kaledhonkar, Santa Clara, CA (US); Uma Maheswari Kandaswamy, San Jose, CA (US); Kamaljeet Ahluwalia, Fremont, CA (US); Lev Sigal, Foster City, CA (US); Rukmini Reddy Muduganti, Dublin, CA (US); Koptilin Pavel Vladimirovich, Odessa (UA); Yurii Logosha, Yuzhny (UA)

(73) Assignee: Selectica, Inc., San Mateo, CA (US)

( * ) Notice: Subject to any disclaimer, the term of this patent is extended or adjusted under 35 U.S.C. 154(b) by 224 days.

(21) Appl. No.: 13/560,794

(22) Filed: Jul. 27, 2012

(65) Prior Publication Data
US 2014/0032472 A1   Jan. 30, 2014

(51) Int. Cl.
*G06N 5/00*   (2006.01)
*G06F 1/00*   (2006.01)

(52) U.S. Cl.
USPC .............................. 706/48; 716/136; 370/252

(58) Field of Classification Search
CPC ........... G06N 5/04; G06N 5/025; G06N 5/02; G06N 5/47; G06Q 10/06
USPC ......................................................... 706/48
See application file for complete search history.

(56) References Cited

U.S. PATENT DOCUMENTS

| 7,720,794 | B2 | 5/2010 | Wood |
| 2003/0204527 | A1 | 10/2003 | Callahan |
| 2005/0251409 | A1 | 11/2005 | Johnson et al. |
| 2006/0129261 | A1 | 6/2006 | Morita et al. |
| 2007/0016890 | A1 | 1/2007 | Brunner et al. |
| 2007/0094641 | A1 | 4/2007 | Darr et al. |
| 2007/0168391 | A1 | 7/2007 | Coschigano et al. |
| 2007/0168965 | A1 | 7/2007 | Zenz et al. |
| 2009/0070073 | A1 | 3/2009 | Wood |
| 2009/0089174 | A1 | 4/2009 | Brunner et al. |

(Continued)

OTHER PUBLICATIONS

Peltonen, Hannu et al., "Product Configurations—An application for prototype object approach." Object-oriented programming, M. Tokoro and R. Pareschi (eds.), Proc. of the 8th ECOOP Conference, lecture notes in computer science 821, Springer-Verlag, pp. 513-534, 1994.

(Continued)

*Primary Examiner* — Jeffrey A Gaffin
*Assistant Examiner* — Kalpana Bharadwaj
(74) *Attorney, Agent, or Firm* — Lessani Law Group, PC (57) ABSTRACT

A configuration system, method, and software program is provided for enabling users to create and use rule patterns to generate custom product-configuration rules. The method includes enabling a designer to submit example rules or template rules for a rule pattern. The designer is then able to select which variables will be customizable in instances of the rule pattern. A modeler is able to select the rule pattern from a rule pattern library as a basis for creating custom configuration rules for a product. In response to the modeler selecting the rule pattern from the library, a user interface is generated in which the customizable fields for each template rule in the rule pattern are displayed and the modeler is able to enter values for the customizable fields. Configuration rules are then generated for the product from the template rules and the values entered by the modeler for the customizable fields.

8 Claims, 7 Drawing Sheets

(56) References Cited

U.S. PATENT DOCUMENTS

| | | |
|---|---|---|
| 2010/0036776 A1 | 2/2010 | Musharbash |
| 2010/0074125 A1* | 3/2010 | Chandra et al. ............... 370/252 |
| 2010/0145492 A1 | 6/2010 | Russell |
| 2011/0061011 A1 | 3/2011 | Hoguet et al. |
| 2011/0161054 A1 | 6/2011 | Woolf et al. |
| 2011/0213480 A1 | 9/2011 | Zila et al. |
| 2011/0302003 A1* | 12/2011 | Shirish et al. ................ 705/7.38 |
| 2012/0047045 A1 | 2/2012 | Gopikrishna et al. |
| 2013/0263089 A1* | 10/2013 | Banerjee et al. .............. 717/124 |

OTHER PUBLICATIONS

International Search Report and Written Opinion in corresponding PCT Application No. PCT/US2013/051155 dated Feb. 2, 2014.

* cited by examiner

SELECTICA Playbook

| Product Catalog | Rules | Process Control | Administration |

Organize
- Guided Selling Rules
- Cross Product Rules
- *Product Rules*
- Rule Patterns

C1 Car-EntertainmentSystem discounting

Enabled ☐  ☑Release  ☑Start Date [ ] ☐  End Date [ ] ☐

Car-EntertainmentSystem discounting – Black or Grey

If _382_
SelectedCarExteriorColor  MEMBER  ("Red")   [Select Items]
Then _384_
Color   –   "White"   [Select Items]

Car-EntertainmentSystem discounting – Discount

If _386_
SelectedCars   CONTAINS  [&"BMW"]   [Select Items]
Then _388_
Discount   –   "15"   [Select Items]

[Back to Rules List] [Save]
_390_

*FIG. 3g*

SYSTEM, METHOD, AND SOFTWARE PROGRAM PRODUCT FOR ENABLING USERS TO CREATE AND USE RULE PATTERNS TO GENERATE CUSTOM PRODUCT-CONFIGURATION RULES

BACKGROUND OF THE INVENTION

1. Field of the Invention

This invention relates generally to configuration systems and, more particularly, to enabling users to create and use a collection of template rules to generate custom product-configuration rules.

2. Description of the Background Art

Consumers are not satisfied with cookie-cutter, one-size fits all products and services. They want to be able to customize and configure their products and services to meet their particular needs. In order to meet this demand, companies employ product configurators to ensure that the customized products and services chosen by their customers are not incompatible (e.g., due to manufacturing restrictions or company policies, etc.). Companies, however, often have hundreds or thousands of products. Creating custom configuration rules for each of these products requires significant resources, including development time and coding. Moreover, the process is often mistake-prone.

Luckily, many configuration rules exhibit repeatable configuration logic and behavior, or rule patterns. Therefore, there is the need for a system, method, and computer program product that takes advantage of the rule patterns to enable companies to create and use templates to generate custom product-configuration rules, thus reducing unnecessary time, energy, and resources to individually model the rules.

SUMMARY OF THE INVENTION

The present invention provides a configuration system, method, and software program for enabling users to create and use a collection of template rules to generate custom product-configuration rules. The method includes enabling a designer to submit one or more example rules for a rule pattern. In response to the designer submitting one or more example rules for a rule pattern, the system identifies any variables in the example rules. The designer is then able to select which of the identified variables will be customizable in instances of the rule pattern. The rule pattern is created from the submitted example rules. For each submitted example rule, the rule pattern includes a corresponding template rule and the selected variables are customizable fields in the template rules.

The rule pattern is added to a rule pattern library. A product modeler is able to select the rule pattern as a basis for creating custom configuration rules for a product. In response to the product modeler selecting the rule pattern from the library, a user interface is generated in which the customizable fields for each template rule in the rule pattern are displayed and the product modeler is able to enter values for the customizable fields. Configuration rules are then generated for the product from the template rules and the values entered by the product modeler for the customizable fields.

In certain embodiments, the designer can directly submit one or more template rules and identify one or more variables within the template rules for a rule pattern. The rule pattern is then created from the submitted template rules, where the one or more variables are customizable fields in the template rules.

In certain embodiments, a user interface is provided via which a designer is able to create a rule pattern. The interface enables the designer to enter a name for the rule pattern, submit example rules, select which of the submitted rules will be used in the rule pattern, select which variables in the submitted rules will be customizable in instances of the rule pattern, and enable the rule pattern for use in the rule pattern library.

DETAILED DESCRIPTION OF THE PREFERRED EMBODIMENTS

The present invention provides a system, method, and computer program product for enabling users to create and use a collection of template constraints to generate custom product-configuration rules.

Figure 1A:
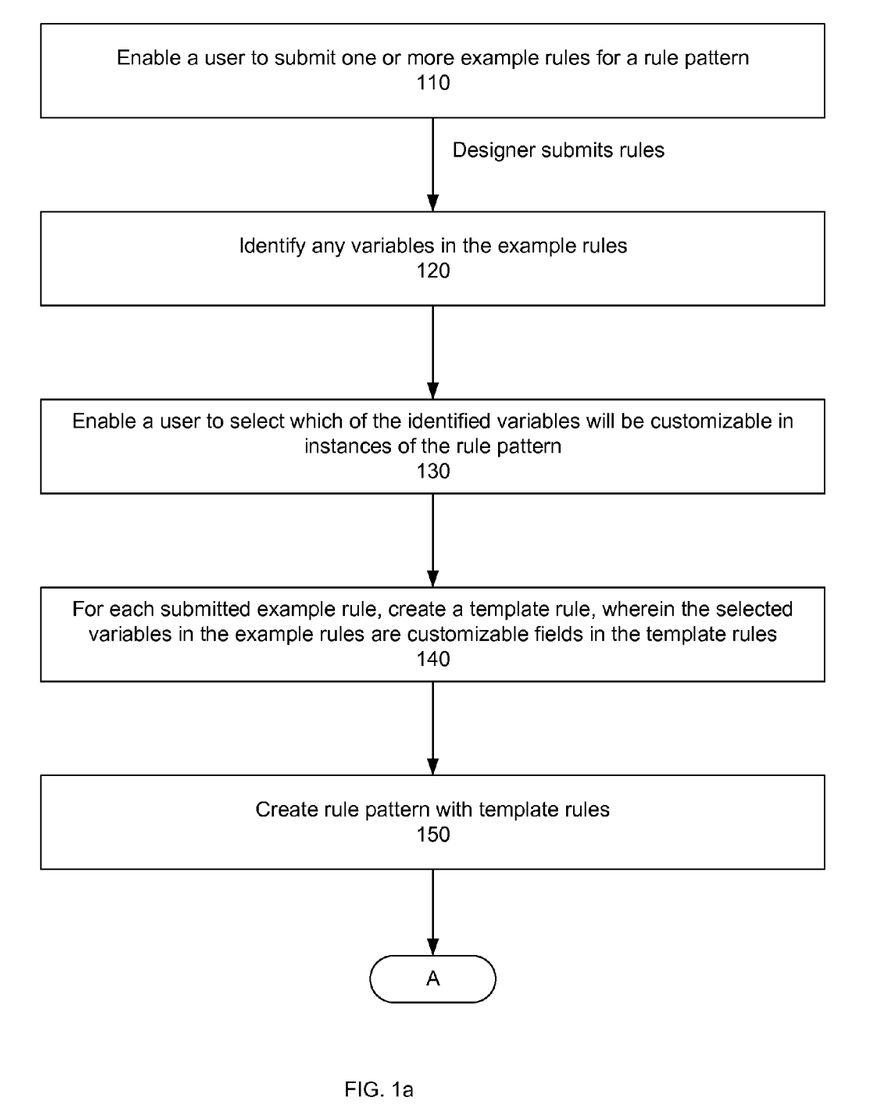
FIGS. 1a-1b are a flowchart that illustrates a method for enabling users to create and use a collection of template rules to generate custom product-configuration rules according to one embodiment of the invention.
Figure 1B:
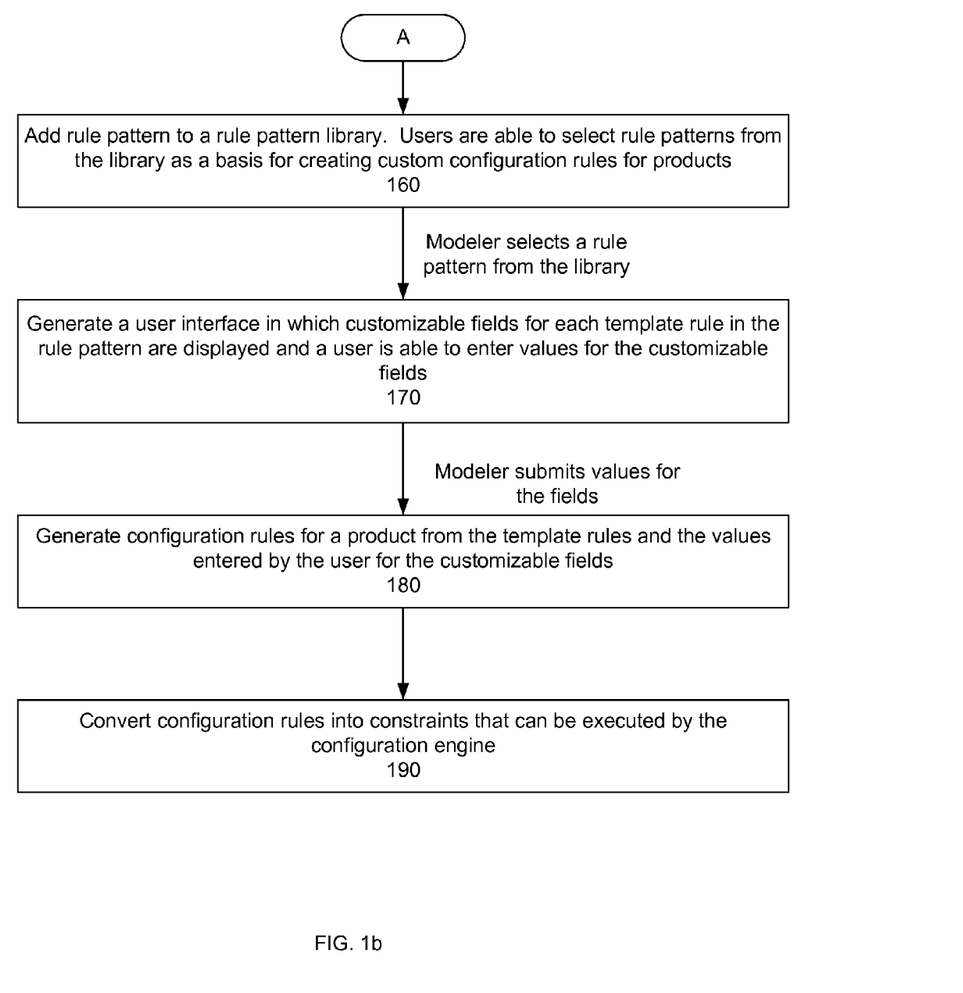

In a preferred method, shown in FIGS. 1a-1b, a user, or designer, is able to submit one or more example rules for a rule pattern (step 110). For example, for a rule pattern related to a car entertainment system, the designer may submit two example rules: 1) If a car's color is black or grey, then the car's entertainment system's color must also be black or grey, and 2) if the car is an Audi, then apply a promotional discount of 10% on certain entertainment systems. After the designer submits the example rules, the system identifies any variables in the example rules (step 120). In the above example rules for a car entertainment system, the exterior car colors, entertainment system colors, make of the car, and discount percentage would all be identified by the system as variables. The designer is then able to select which of the identified variables will be customizable in instances of the rule pattern (step 130). For each submitted example rule, a template rule is created, where the selected variables in the example rules are customizable fields in the template rules (step 140). The non-selected variables (i.e., not customizable) will default to the value entered in the example rules. The rule pattern is then created with the template rules (step 150).

The rule pattern is then added to a rule pattern library (step 160). Users, or product modelers, are able to select rule patterns from the library as a basis for creating custom configuration rules for products. After the product modeler selects a rule pattern from the library, a user interface is generated in which customizable fields for each template rule in the rule pattern are displayed and the product modeler is able to enter values for the customizable fields (step 170). For example, if the product modeler chooses a rule pattern based on the above example rules, he or she may then enter variables for the customizable fields in the two template rules, namely exterior car color/entertainment system color and make of the car/discounting (as shown in FIGS. 3f-3g). After the product modeler submits values for the fields, the configuration rules are generated for a product from the template rules and the values entered by the user for the customizable fields (step

180). The configuration rules are then converted into constraints that can be executed by the configuration engine (step 190).

In certain embodiments, instead of submitting an example rule from which a rule template is created, the designer can directly submit one or more template rules. The system identifies one or more variables within the template rules for a rule pattern. The rule pattern is then created from the submitted template rules, where the one or more variables are customizable fields in the template rules.

In certain embodiments, a user interface is provided via which a designer is able to create a rule pattern. The interface enables the designer to enter a name for the rule pattern, submit example rules, select which of the submitted rules will be used in the rule pattern, select which variables in the submitted rules will be customizable in instances of the rule pattern, and enable the rule pattern for use in the rule pattern library. An example of such a user interface is depicted in FIGS. 3*a*-3*g*, which are discussed in more detail below.

Figure 2:
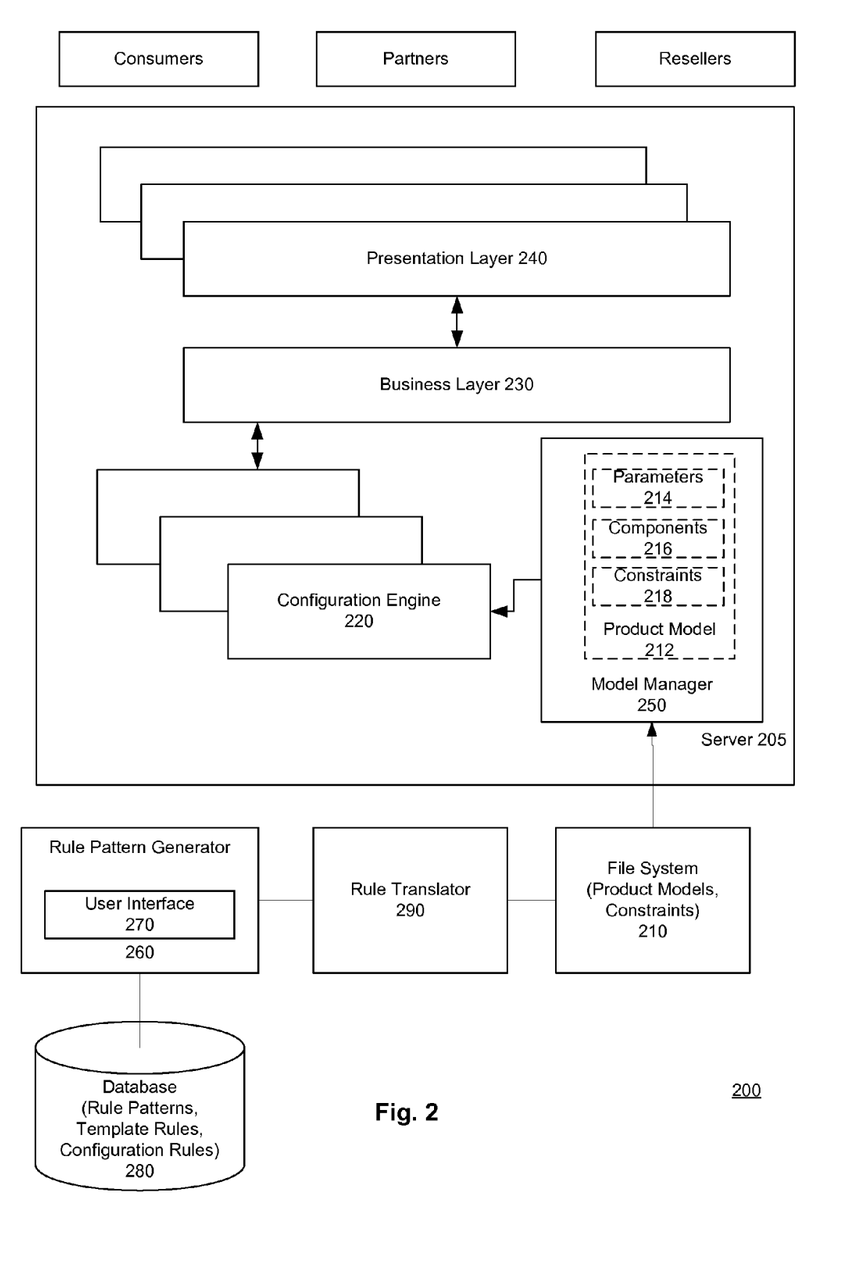
FIG. 2 is a block diagram that illustrates an example of a configuration system.

FIG. 2 illustrates an example of a configuration system 200 in which the present invention may be implemented and used. As a person skilled in the art would understand, the system may be constructed in any number of ways, having more or less modules and different interconnectivity, within the scope of the present invention. The method of FIGS. 1*a*-1*b* may be implemented in other systems, and the invention is not limited to system 200.

File system 210 stores the product data (e.g., the product models and constraints) for products that can be configured via configuration system 200. The product data in file system 210 is used to generate product model objects for products. In one embodiment, the product data in file system 210 includes the product models in text form (as opposed to object form).

The primary elements of a product model 212 are:

Parameters (214): These are the product options (including service product options) that a user can select.

Components (216): Product parts (including service product parts) are represented as "components."

Constraints (includes rules) (218): The permissible relationships between parameters, as well as between parameters and components, are captured as constraints. Constraints are the executable versions of configuration rules.

Server 205 includes (and executes) a configuration engine 220, a business layer application 230, a presentation layer application 240, and a product model manager 250.

The configuration engine 220 guides a user (e.g., a customer) through a product configuration in accordance with a product model. Product model manager 250 holds the product models used by configuration engine 220 in memory ensuring easy access by the configuration engine 220. When required, the product model manager 250 retrieves product data, such as, for example, product model information in text format, from file system 210 and generates a product model object 212 from the data. As every product in the system will have its own product model, there may be multiple product models loaded at one time.

During a configuration session, the configuration engine 220 presents (via the presentation layer 240) the user with parameters for a product, and the user makes parameter selections. The configuration engine 220 reacts to each of the user's selections by executing all applicable constraints in the product model. If the user's selection violates a constraint, the configuration engine 220 rejects the user's selection and prompts the user for a new selection. If the user's selection is acceptable, the configuration engine 220 creates a new state of configuration (in one embodiment), and waits for the user's next selection.

The presentation application 240 provides a client user interface for the end user of the configuration system (e.g., a consumer configuring a product). The client user interface may be a browser-based application or a desktop application. The business layer 230 translates data from the configuration engine 220 into a format compatible with the presentation layer 240, and vice versa. Also, any third party data that is used in the presentation layer (e.g., data from a CRM system) may be integrated into the configuration system 200 at business layer 230.

The rule pattern generator 260, having a user interface 270, generates the rule patterns according to the method described above with regard to FIGS. 1*a*-1*b*. A designer uses the user interface 270 to submit one or more example rules for a rule pattern. The rule pattern generator 260 identifies any variables in the example rules. The designer then is able to select which of the identified variables displayed on the user interface 270 will be customizable in instances of the rule pattern. For each submitted example rule, a template rule is created, where the selected variables in the example rules are customizable in the template rules. The rule pattern generator 260 then creates the rule pattern with the template rules and stores the rule patterns and template rules in a rule pattern library on one or more databases 280.

Product modelers are able to view and select rule patterns from the rule pattern library as displayed on the user interface 270. Once the product modeler has selected a rule pattern, he or she is able to enter values into the customizable fields for each template rule in the rule pattern. Configuration rules are then generated by the rule pattern generator 260 and stored in the one or more databases 280. The rule translator 290 converts the configuration rules into constraints. These constraints are stored by the file system 210 and are ready for execution by the configuration engine 220.

An example of a configuration system like configuration system 200 is the Selectica® Configurator (also known as the Selectica® Configuration Platform).

The method described with respect to FIGS. 1*a*-1*b* are embodied in software and performed by a computer system executing the software. A person skilled in the art would understand that a computer system has a memory or other physical, computer-readable storage medium for storing software instructions and one or more processors for executing the software instructions.

FIGS. 3*a*-3*g* illustrate screenshots of an exemplary user interface for creating and using rule patterns. A person skilled in the art would understand that the present invention may be embodied on other user interfaces having more or less functionality within the scope of the present invention. As such, FIGS. 3*a*-3*g* are intended to be illustrative and not limiting in any way.

Figure 3A:
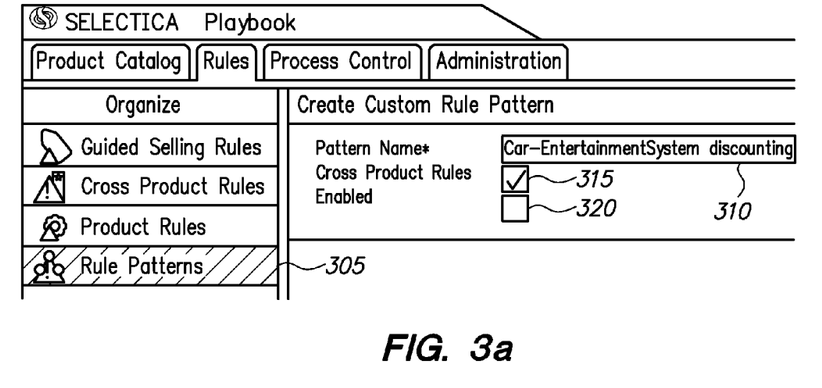
FIGS. 3a-3g are screenshots of exemplary user interfaces for creating and using rule patterns according to one embodiment of the invention.

FIG. 3*a* illustrates a user interface that allows a designer to create a rule pattern 305. In the first field 310, the designer enters the name of the rule pattern. In the second field, 315, the designer can indicate whether this rule is system-wide (i.e., applies to more than one product in the product catalog) or applicable to only one product. In the third field 320, the designer can indicate whether or not he or she would like to enable the rule pattern.

Figure 3B:
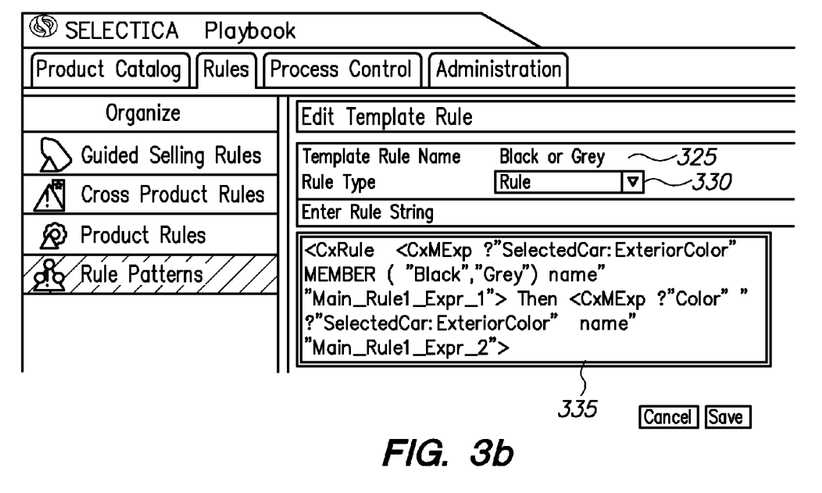
Figure 3C:
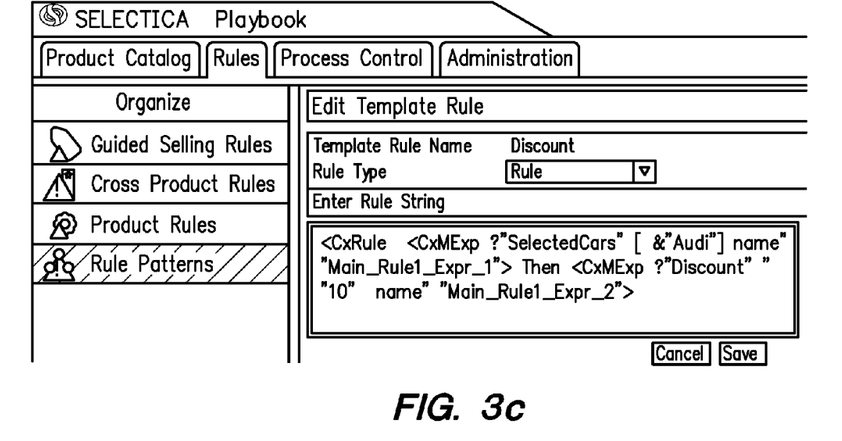

FIG. 3*b* illustrates a user interface in which the designer has entered a first example rule. The first example rule has a template rule name 325, a rule type 330 (e.g., rule, mathematical expression), and a field for entering the example rule 335. FIG. 3*c* is similar to FIG. 3*b* and illustrates a user interface in which the designer has entered a second example rule.

Figure 3D:
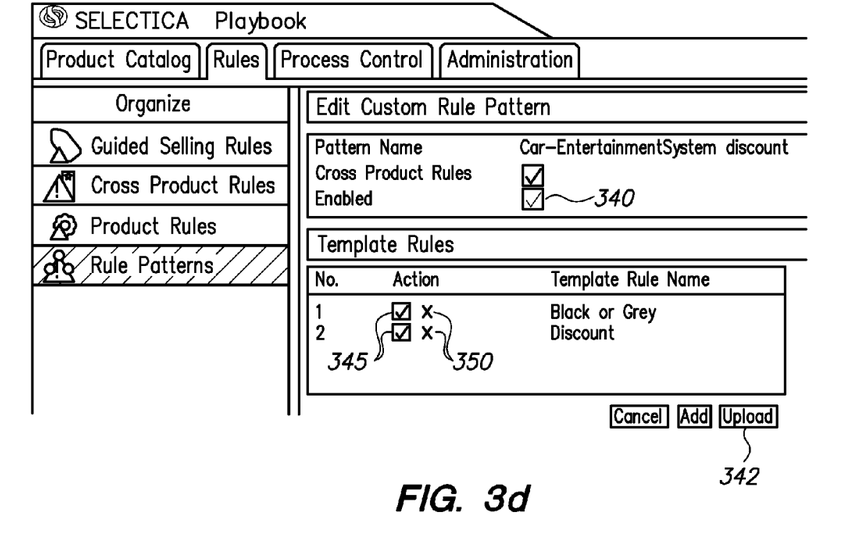

In FIG. 3d, once the designer has entered each of the example rules that he or she wishes to include in the particular rule pattern, the designer uploads and enables the rule pattern by checking the enabled button 340 and the upload button 342. The designer can also change his or her previous inputs related to one or more of the template rules by clicking on an edit icon 345 or delete any previously entered template rule by clicking on the delete icon 350.

Figure 3E:
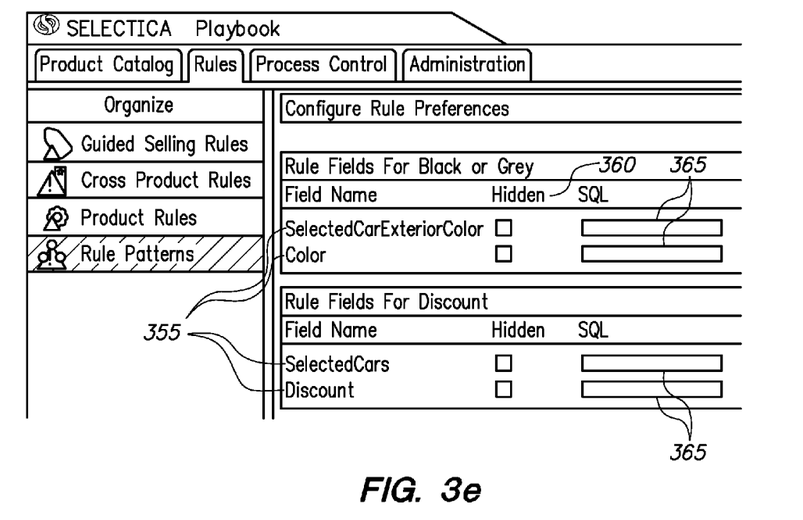
Figure 3F:
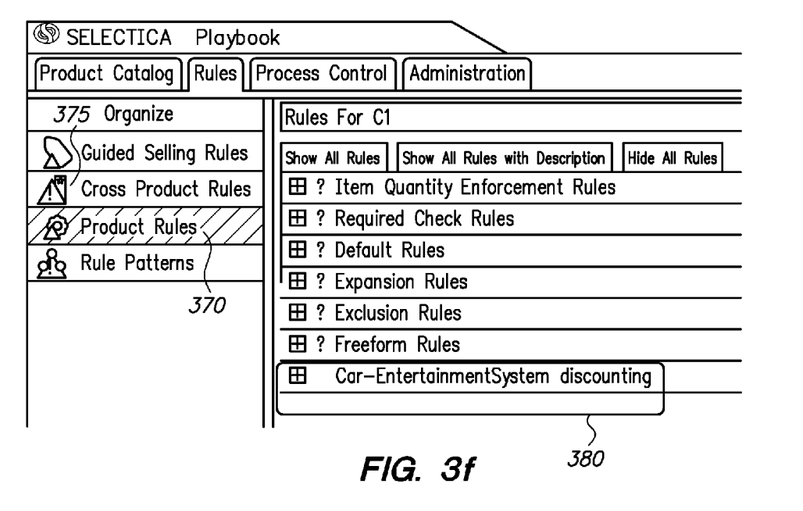
Figure 3G:
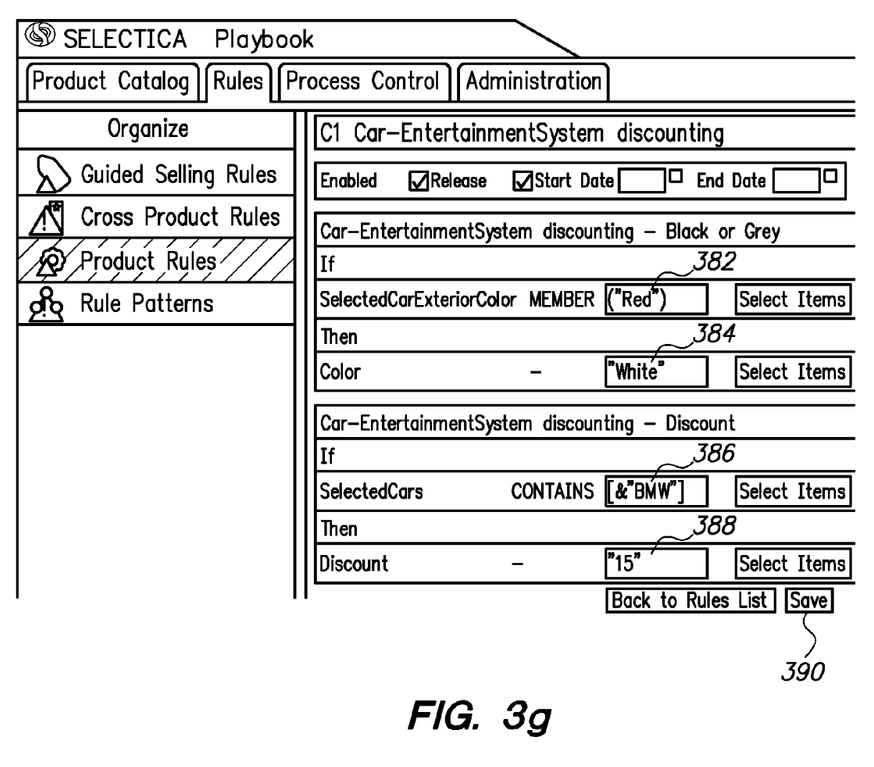

In FIG. 3e, the rule pattern generator identifies and displays the variables from the example rules 355. The designer can then chose to hide the variable (i.e., designate the variable as not customizable) by checking the hidden box 360. In which case, the default value of the variable will be the same as the example rule. If, however, the designer does not check the hidden box 360, the variable is displayed as a customizable field in the template rule.

To create an optional drop-down menu for value options for the variable, the designer enters a database query in box 365, wherein the database query is for a table in a database in which options for the values of the variable are stored. If a database query is entered in box 365, the drop down menu will be displayed in the user interface that is generated when a product modeler selects the rule pattern as a basis for creating custom configuration rules (e.g., the user interface described in step 170 of FIG. 1).

Once the designer has submitted the one or more example rules and selected which variables to make customizable, the rule pattern generator creates the rule pattern with the template rules. A product modeler can access the rule pattern from a rule pattern library. In this case, shown in FIG. 3f, the product modeler has clicked on the section for product rules 370, as opposed to system rules 375, and views the rules for product C1. Among the rules is the rule created by the designer in our example, listed as "Car-EntertainmentSystem discounting" 380.

When the product modeler opens up the rule "Car-EntertainmentSystem discounting," he or she is brought to the user interface of FIG. 3g where the variables from the rule pattern are shown as customizable fields for the product modeler to create a new configuration rule. In this example, the product modeler entered "red" into the customizable field for the exterior color of the car 382, "white" into the customizable field for the color of the entertainment system 384, "BMW" into the customizable field for the make of the car 386, and "15" into the customizable field for the percentage discount 388. Once saved 390, the two configuration rules added to the system are as follows: 1) if the exterior car color is red, then the entertainment system must be white and, 2) if the make of the car is a BMW, then a 15% discount is applied on the entertainment system. The rules are then converted into constraints which are executable by a configuration engine.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method, in a configuration system, for enabling users to create and use a collection of template rules to generate custom product-configuration rules, the method comprising:
enabling a user to submit one or more example rules for a rule pattern;
in response to a user submitting one or more example rules for a rule pattern, identifying any variables in the example rules;
enabling a user to select which of the identified variables will be customizable in instances of the rule pattern;
creating the rule pattern from the submitted example rules, wherein, for each submitted example rule, the rule pattern includes a corresponding template rule and wherein the selected variables are customizable fields in the template rules;
adding the rule pattern to a rule pattern library, wherein a user is able to select the rule pattern as a basis for creating custom configuration rules for a product;
in response to a user selecting the rule pattern from the library, generating a user interface in which the customizable fields for each template rule in the rule pattern are displayed and a user is able to enter values for the customizable fields; and
generating configuration rules for a product from the template rules and the values entered by the user for the customizable fields.

2. The method of claim 1, wherein the enabling steps comprise:
providing a user interface via which a user is able to create a rule pattern, wherein the interface enables the user to enter a name for the rule pattern, submit example rules, select which of the submitted rules will be used in the rule pattern, select which variables in the submitted rules will be customizable in instances of the rule pattern, and enable the rule pattern for use in the rule pattern library.

3. A method, in a configuration system, for enabling users to create and use a collection of template rules to generate custom product-configuration rules, the method comprising:
enabling a user to submit one or more template rules and to identify one or more variables within the template rules for a rule pattern;
creating the rule pattern from the submitted template rules, wherein the one or more variables are customizable fields in the template rules;
adding the rule pattern to a rule pattern library, wherein a user is able to select the rule pattern as a basis for creating custom configuration rules for a product;
in response to a user selecting the rule pattern from the library, generating a user interface in which the customizable fields for each template rule in the rule pattern are displayed and a user is able to enter values for the customizable fields; and
generating configuration rules for a product from the template rules and the values entered by the user for the customizable fields.

4. A computer program embodied on a non-transitory computer-readable medium and comprising code, that, when executed by a computer system, enables the computer system to perform the following method for enabling users to create and use a collection of template rules to generate custom product-configuration rules, the method comprising:
enabling a user to submit one or more example rules for a rule pattern;
in response to a user submitting one or more example rules for a rule pattern, identifying any variables in the example rules;
enabling a user to select which of the identified variables will be customizable in instances of the rule pattern;
creating the rule pattern from the submitted example rules, wherein, for each submitted example rule, the rule pattern includes a corresponding template rule and wherein the selected variables are customizable fields in the template rules;
adding the rule pattern to a rule pattern library, wherein a user is able to select the rule pattern as a basis for creating custom configuration rules for a product;

in response to a user selecting the rule pattern from the library, generating a user interface in which the customizable fields for each template rule in the rule pattern are displayed and a user is able to enter values for the customizable fields; and generating configuration rules for a product from the template rules and the values entered by the user for the customizable fields.

5. The computer program of claim 4, wherein the enabling steps comprise:

providing a user interface via which a user is able to create a rule pattern, wherein the interface enables the user to enter a name for the rule pattern, submit example rules, select which of the submitted rules will be used in the rule pattern, select which variables in the submitted rules will be customizable in instances of the rule pattern, and enable the rule pattern for use in the rule pattern library.

6. A computer system for enabling users to create and use a collection of template rules to generate custom product-configuration rules, the system comprising:

a processor;

a memory coupled to the processor, wherein the memory stores instructions that, when executed by the processor, causes the system to perform the operations of:

enabling a user to submit one or more example rules for a rule pattern;

in response to a user submitting one or more example rules for a rule pattern, identifying any variables in the example rules;

enabling a user to select which of the identified variables will be customizable in instances of the rule pattern;

creating the rule pattern from the submitted example rules, wherein, for each submitted example rule, the rule pattern includes a corresponding template rule and wherein the selected variables are customizable fields in the template rules;

adding the rule pattern to a rule pattern library, wherein a user is able to select the rule pattern as a basis for creating custom configuration rules for a product;

in response to a user selecting the rule pattern from the library, generating a user interface in which the customizable fields for each template rule in the rule pattern are displayed and a user is able to enter values for the customizable fields; and generating configuration rules for a product from the template rules and the values entered by the user for the customizable fields.

7. The computer system of claim 6, wherein the enabling steps comprise:

providing a user interface via which a user is able to create a rule pattern, wherein the interface enables the user to enter a name for the rule pattern, submit example rules, select which of the submitted rules will be used in the rule pattern, select which variables in the submitted rules will be customizable in instances of the rule pattern, and enable the rule pattern for use in the rule pattern library.

8. The method of claim 1, further comprising generating constraints from the generated configuration rules.

* * * * *